United States Patent [19]

Ravid

[11] Patent Number: 5,801,933
[45] Date of Patent: Sep. 1, 1998

[54] HIGH EFFICIENCY VOLTAGE CONVERTER AND REGULATOR CIRCUIT

[75] Inventor: Arie Ravid, Palo Alto, Calif.

[73] Assignee: Abbott Laboratories, Abbott Park, Ill.

[21] Appl. No.: 819,079

[22] Filed: Mar. 18, 1997

Related U.S. Application Data

[63] Continuation of Ser. No. 310,289, Sep. 21, 1994, abandoned.
[51] Int. Cl.⁶ .................................................. H02M 5/42
[52] U.S. Cl. ............................. 363/89; 363/53; 363/126
[58] Field of Search .......................... 363/39, 81, 126, 363/127, 53

[56] References Cited

U.S. PATENT DOCUMENTS 3,947,752  3/1976  Morgan ................................. 323/17
4,641,233  2/1987  Roy ....................................... 363/89
4,685,046  8/1987  Sanders ................................. 363/89
5,126,652  6/1992  Carlin ................................... 323/267

*Primary Examiner*—Robert Nappi
*Assistant Examiner*—Shawn Riley
*Attorney, Agent, or Firm*—Neal D. Marcus

[57] ABSTRACT

A voltage converter and a method for converting AC to DC. A MOSFET (42, 118) conveys current from a full wave rectifier to charge a capacitor (60) that supplies current to a load (64). In a first embodiment, two transistors (32, 34) are connected as a differential pair to control the voltage applied to the gate of the MOSFET, referenced to a zener voltage developed across zener diode (36) that is connected to the emitters of the two transistors. In a second embodiment, a single transistor controls the voltage applied to the gate of the MOSFET, relative to a zener voltage of a zener diode (132). The MOSFET charges the capacitor while the voltage applied to its gate from the rectified signal is greater than the voltage across the capacitor.

23 Claims, 2 Drawing Sheets

HIGH EFFICIENCY VOLTAGE CONVERTER AND REGULATOR CIRCUIT

This application is a file wrapper continuation application, based on prior application Ser. No. 08/310,289, filed on Sep. 21, 1994, the benefit of the filing date of which is hereby claimed under 35 U.S.C. § 120 now abandoned.

FIELD OF THE INVENTION

The present invention generally relates to apparatus and a method for converting an alternating current (AC) to a direct current (DC), and more specifically, to apparatus and a method for rectifying the AC to produce a rectified signal and regulating the rectified signal to limit the voltage of the DC supplied to the load.

BACKGROUND OF THE INVENTION

A component required in almost all non-battery powered electrical devices that require DC is a power supply that will couple to an AC line and convert the AC to DC. There are many designs in the prior art for power supplies to accomplish this function. Most AC-DC switching power supplies that are directly powered by the AC line employ a transformer to isolate the line side of the circuit from the output side. A winding on the transformer in such circuits is sometimes employed to provide an AC voltage that is rectified to DC and used to provide power to a control circuit on the line side of the power supply. The transformer and associated components used for this purpose are referred to in the following discussion as an AC-DC voltage converter.

For certain applications, it is desirable that the power supply or AC-DC converter comprise as few components as possible to minimize its cost. In some low cost AC-DC voltage converter designs, a resistor having a high power rating is used to reduce the line voltage instead of a transformer, and the DC voltage level is regulated using a zener diode. The current limiting resistor that is used for this purpose tends to dissipate considerable energy as heat, due to the $I^2R$ losses in the resistor. Because of the power losses in the resistor, this type of converter is very inefficient. For international use in countries where the AC voltage levels are much higher than in the U.S., this type of simple design may be unusable because the heat generated in the resistor causes its temperature to rise to an unacceptable level. Thus, an alternative design for a low cost, low part count power supply/converter is required that is efficient and can operate over a wide range of line voltage levels, including those used in other countries. Such a converter can be used alone as an inexpensive power supply, where precise regulation, isolation, and low ripple on the DC output are not critical, or as the source of the power required by the line side control circuit of a switching power supply.

SUMMARY OF THE INVENTION

In accordance with the present invention, a voltage converter for converting an AC line signal to a DC output signal supplied to a load is defined. The voltage converter includes a full wave rectifier that converts the AC line signal to a full wave rectified signal comprising a plurality of substantially identical successive half cycle waveforms. A capacitor adapted to be coupled in parallel with the load is also provided. First switching means, coupled to the full wave rectifier and to the capacitor, conduct a charge current to the capacitor at least once during each half cycle waveform. Second switching means, coupled to the full wave rectifier, the capacitor, and the first switching means, are operative to regulate a conductance of the first switching means as a function of both the DC output signal and the full wave rectified signal, both of which vary with time. The second switching means thereby regulate the DC output signal by controlling the current applied to charge the capacitor so that the voltage across the capacitor does not exceed a predetermined maximum level.

In one embodiment, the second switching means comprise one transistor and a zener diode. In another embodiment, the second switching means comprise a zener diode, and a pair of transistors, each having a base, an emitter, and a collector. The pair of transistors have their collectors coupled together and their emitters coupled together, to form a differential pair. The first switching means preferably comprise a metal-oxide semiconductor field effect transistor (MOSFET) having a gate coupled to the second switching means so that the second switching means control the voltage applied to the gate and thus control the conductive state of the MOSFET.

The voltage converter further comprises a carbon resistor coupled in series between the full wave rectifier and the first switching means. If current flow through the carbon resistor substantially exceeds a maximum rated value as a result of a fault in one of the first switching means and the second switching means, the carbon resistor fails in an open circuit mode, interrupting the current flow to said one of the first and the second switching means and to any load coupled thereto. To provide further protection in one embodiment, a zener diode is preferably coupled in parallel with the second switching means. The zener diode limits a voltage applied to the load if a fault occurs in the second switching means.

A further aspect of the present invention is a method for converting an AC signal to a DC signal. The steps of the method are generally consistent with the functions of each of the elements of the voltage converter discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
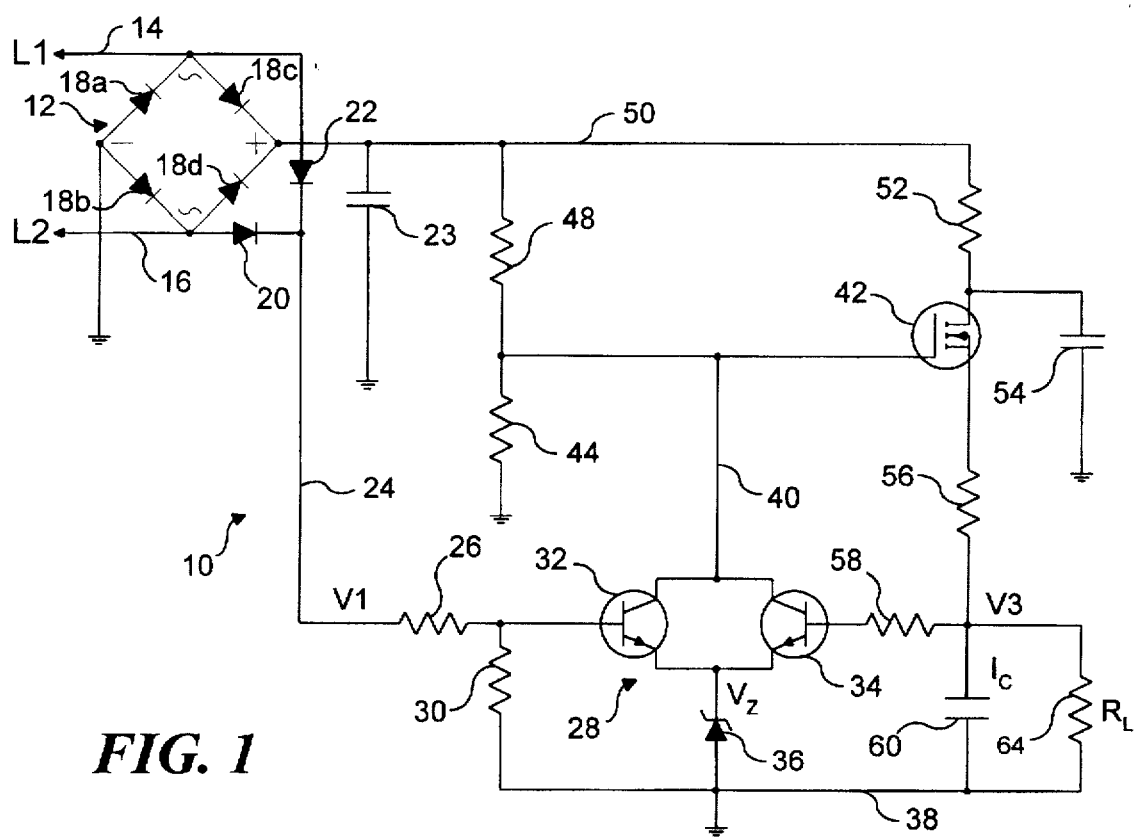
FIG. 1 is an electrical schematic diagram of a first embodiment of a voltage converter in accordance with the present invention.

As noted above, one of the objects of the present invention was to achieve conversion of AC to DC using a circuit having relatively few components, which is both inexpensive and efficient. A high efficiency voltage converter 10, which achieves this object, is shown in a schematic diagram in FIG. 1. With reference to FIG. 1, AC line voltage is coupled to voltage converter 10 on lines 14 and 16. Although the voltage level of the AC supplied to the voltage converter in the U.S. is typically in the range of 110 to 120 volts, and the frequency of the AC is 60 Hz, voltage converter 10 can operate equally well if supplied with other AC frequencies and line voltages on lines 14 and 16, for example, 50 Hz at 220 volts AC, as is common in many foreign countries.

Voltage converter 10 includes a full wave rectifier bridge module 12 that internally comprises four diodes 18a–18d. Four discrete diode connected in a full wave rectifier bridge can also be used for this purpose. As shown on the Figure, the cathodes of diodes 18a and 18b are respectively coupled to lines 14 and 16, and their anodes are grounded. Similarly, the anodes of diodes 18c and 18d are respectively coupled to lines 14 and 16, and their cathodes are connected to a line 50. A full wave rectified signal from the bridge is thus applied to line 50, referenced to ground.

Figure 2A:
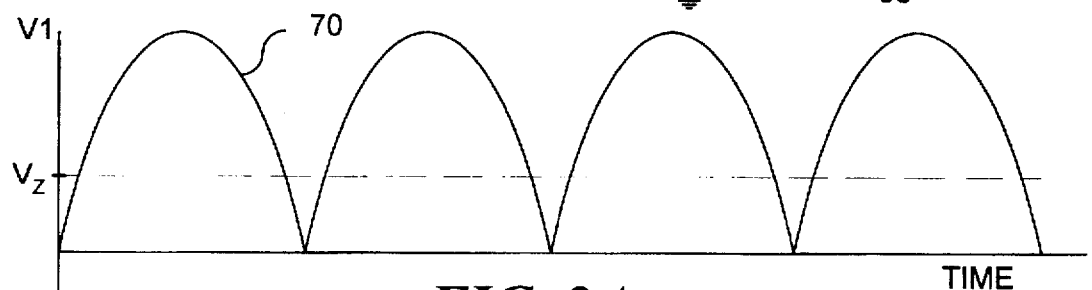
FIG. 2A is graph showing the relationship between a full wave rectified signal and a reference voltage in the first embodiment of the voltage converter.

Line 14 is also connected to the anode of a diode 22, and line 16 is connected to the anode of a diode 20. The cathodes of diodes 20 and 22 are connected together to a line 24 to provide a second full wave rectified signal V1, as shown in FIG. 2A.

Referring again to FIG. 1, the full wave rectified signal V1 on line 24 is input through a resistor 26 to the base of a transistor 32. The base of transistor 32 (NPN) is also coupled to ground through a resistor 30. Transistor 32 and a transistor 34 (NPN) comprise a differential pair 28, because their collectors are connected together to a line 40 and their emitters connected together to the cathode of a zener diode 36. The anode of zener diode 36 is grounded through a line 38. The base of transistor 34 is coupled to receive the voltage applied to a load 64 having a resistance $R_L$. In addition, a capacitor 60 is connected in parallel with the load, one side of capacitor 60 being connected to resistor 58 and the other side being connected through line 38 to ground. The load is also coupled to ground through line 38.

The full wave rectified signal output from full wave rectifier 12 is at least partially filtered by a capacitor 23 that is connected between line 50 and ground. A resulting filtered signal on line 50 is applied through a resistor 52 to the drain of an N-enhanced, metal-oxide semiconductor field effect transistor (MOSFET) 42. The gate of MOSFET 42 is also coupled to line 50 through a resistor 48, and to ground through a resistor 44. Resistors 48 and 44 comprise a voltage divider to reduce the filtered signal on line 50 to a level suitable for input to the gate of the MOSFET. The gate of MOSFET 42 is also connected to the collectors of transistors 32 and 34 through line 40. As explained below, both of these transistors control MOSFET 42. A resistor 56 couples the source of MOSFET 42 to the common node at which resistor 58, capacitor 60, and load 64 are connected, and a capacitor 54, which is connected between the drain and ground, provides additional filtering.

Load 64 is supplied DC from capacitor 60, drawing its voltage level down as it discharges the capacitor. Capacitor 60 is periodically recharged by current flowing through the drain and source of MOSFET 42. However, this charge current, $I_C$, only flows through MOSFET 42 when its gate is biased to a voltage more positive than its source. The voltage applied to the gate of MOSFET 42 varies with the voltage level of the filtered signal on line 50, subject to the conductive state of transistors 32 and 34. Transistor 34 and MOSFET 42 together serve as a voltage regulator that regulates the voltage on capacitor 60 and thus, across load 64. Transistor 32 controls the portion of each half cycle during which this voltage regulator is enabled.

When it is fully saturated and in a conductive state, transistor 32 couples line 40, which is connected to the gate of MOSFET 42, to the cathode of zener diode 36. The conductive state of transistor 32 is controlled by the voltage applied to its base through resistor 26. That voltage, which is a full wave rectified signal having a waveform 70 as shown in FIG. 2A, periodically varies between zero and some nominal value determined by the resistance ratio of resistors 26 and 30. In order for transistor 32 to conduct between its collector and emitter, the base of transistor 32 must be biased to a level more positive than a characteristic zener voltage, $V_Z$, of zener diode 36. For example, if the zener voltage of zener diode 36 is 12.6 volts, transistor 32 will become fully saturated in a conducting state when waveform 70 is substantially greater than the sum of the nominal zener voltage $V_Z$ and the base-emitter voltage drop (about 0.6 volts).

For purposes of the following discussion, the base-emitter voltage drop of transistors 32 and 34 is ignored, so that the reference level is simply the zener voltage $V_Z$, as shown by the dash line in FIG. 2A. As soon as the voltage input to the base of transistor 32 falls below the zener voltage $V_Z$, transistor 32 turns off, i.e., conduction between its collector and emitter ceases. While transistor 32 is in a conductive state, the gate of MOSFET 42 is effectively clamped at the zener voltage level. As the voltage applied to the base of transistor 32 drops below $V_Z$, causing transistor 32 to stop conducting, MOSFET 42 begins conducting current $I_C$ from the filtered signal on line 50 in order to charge capacitor 60. Current $I_C$ continues to flow into capacitor 60 through MOSFET 42 until either transistor 32 or transistor 34 turns on.

Figure 2B:
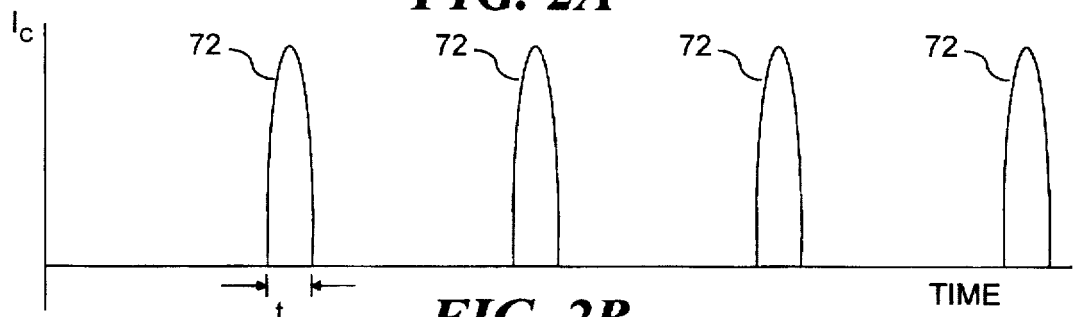
FIG. 2B is a graph showing current pulses that charge a capacitor in the first embodiment.
Figure 2C:
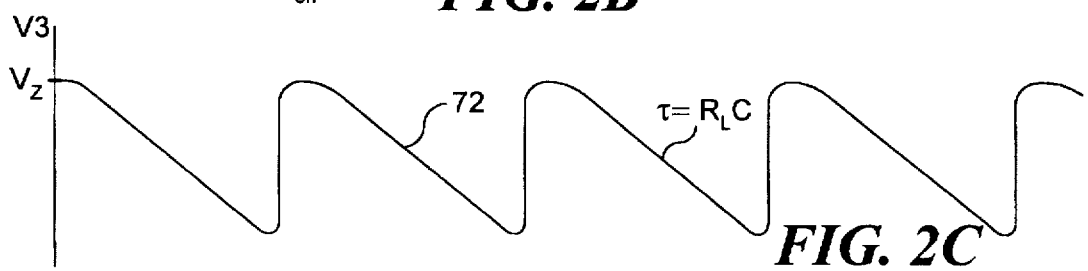
FIG. 2C is a graph showing the ripple on the DC output voltage of the first embodiment of the voltage converter.

Transistor 34 also controls conductance of charge current $I_C$ through MOSFET 42. The base of transistor 34 is coupled through resistor 58 to capacitor 60, to sense the voltage across the capacitor and load 64. If the voltage applied to the base of transistor 34 is substantially greater than the zener voltage of zener diode 36, transistor 34 is biased into a saturated condition and conducts between its collector and emitter terminals, thereby effectively connecting the gate of MOSFET 42 to the cathode of zener diode 36. Just as explained above in connection with transistor 32, conduction through transistor 34 turns off MOSFET 42 so that charge current $I_C$ no longer flows into capacitor 60 (and to the load). It will therefore be apparent that transistor 34 controls the MOSFET as a function of the voltage level across capacitor 60, ensuring that the voltage never exceeds the zener voltage $V_Z$. Accordingly, charge current $I_C$ comprises a series of pulses 72 as shown in FIG. 2B, each lasting for some time interval $t_{on}$, which varies depending upon $R_L$, and thus the rate at which the load discharges capacitor 60. The time interval $t_{on}$ starts when two conditions occur. First, the voltage applied to the base of transistor 32 must be less than the zener voltage, as a function of amplitude of the full wave rectified signal applied to its base. Second, the voltage on capacitor 60 and across the load must be less than the zener voltage. As current flows through MOSFET 42 to charge capacitor 60, the voltage across the capacitor rises until it is approximately equal to the zener voltage, $V_Z$, causing transistor 34 to turn on, or until the voltage input to the base of transistor 32 again periodically rises above the zener voltage, whichever condition occurs first. When current flow through MOSFET 42 ceases, the voltage level across capacitor 60 declines as current is drawn through the load, with a rate of discharge, τ, which is equal to the product of the resistance, $R_L$ of the load 64 and the capacitance, C, of capacitor 60. The ripple component of the voltage across the load is shown in FIG. 2C, as a waveform 72. It should be noted that the vertical scale is substantially expanded in this Figure; the ripple voltage range is typically less than ten percent of the DC output voltage level.

Figure 3:
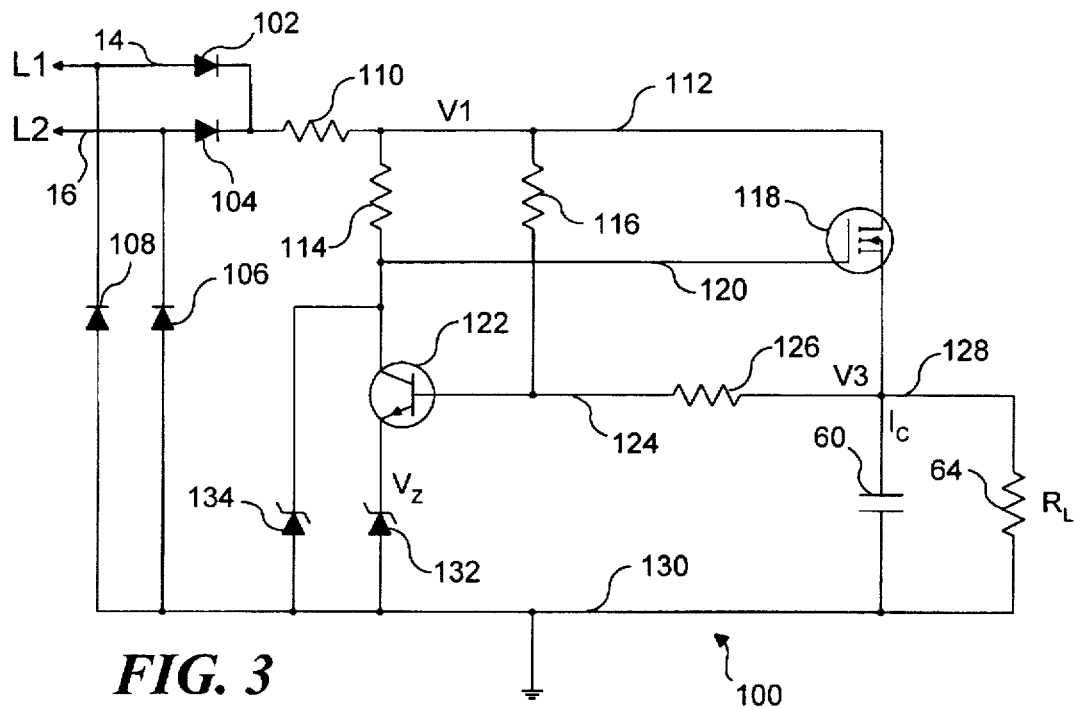
FIG. 3 is an electrical schematic diagram of a second preferred embodiment of the voltage converter.

A high efficiency voltage converter 100, comprising a second embodiment of the present invention, is shown in FIG. 3. Where appropriate, the same reference numerals are used for components of voltage converter 100 as were used for voltage converter 10. Thus, for example, the AC line voltage input to the voltage converter is conveyed on lines 14 and 16. Similarly, the DC output signal supplied to load 64 is provided from the charge on capacitor 60. However, different reference numerals are used for other components of voltage converter 100, even where they provide a similar function to the components of voltage converter 10, if that function is at all different than explained above.

The AC signal input on lines 14 and 16 is again full wave rectified. In voltage converter 100, four discrete diodes 102–108 are employed to full wave rectify the AC line voltage. In this arrangement, the anode of diode 102 and the cathode of diode 108 are connected to line 14. Similarly, the anode of diode 104 and the cathode of diode 106 are connected to line 16. The cathodes of diodes 102 and 104 are jointly connected to a resistor 110, and the anodes of diodes 106 and 108 are coupled to ground through a line 130.

The opposite side of resistor 110 is connected through a line 112 to a resistor 114, a resistor 116, and to the drain of a MOSFET 118. The other side of resistor 114 is connected through a line 120 to the gate of MOSFET 118 and to the collector of a transistor 122 (NPN). Line 120 is also connected to the cathode of a zener diode 134.

Figure 4A:
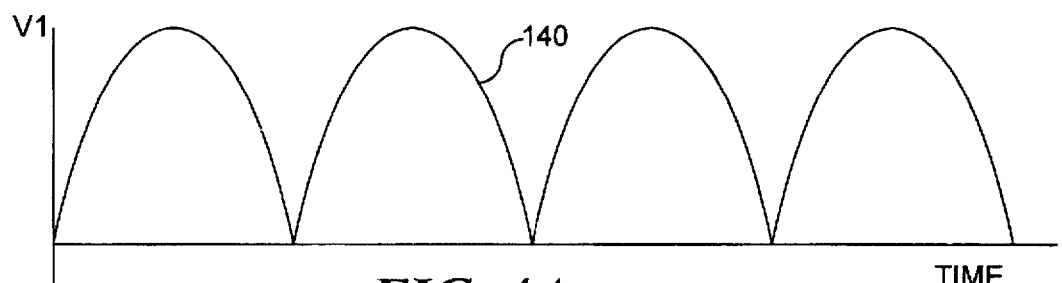
FIG. 4A is a graph showing a full wave rectified signal developed in the second embodiment.

The base of transistor 122 is coupled to the full wave rectified signal on line 112 (again identified as V1) as shown by a waveform 140 in FIG. 4A, through resistor 116. Resistor 116 is connected to the base of the transistor through a line 124, which also connects to the load through a resistor 126 and a line 128. Line 128 couples the load to capacitor 60 and to the source of MOSFET 118.

A zener diode 132 is connected to the emitter of transistor 122 and its characteristic zener voltage $V_Z$ again determines the maximum voltage applied to the load and to charge capacitor 60. The anode of zener diode 132 is coupled to ground through line 130.

Charge current $I_C$ supplied to capacitor 60 (and to the load) flows through MOSFET 118 between its drain and source terminals, when the MOSFET is in a conducting state. The conductance of MOSFET 118 is controlled by the voltage applied to its gate through line 120. The voltage on line 120 in turn depends upon full wave rectified voltage V1 and the conductive state of transistor 122. While transistor 122 is not conducting, the voltage on line 120 has a waveform similar to that shown in FIG. 4A. However, when transistor 122 begins conducting between its collector and emitter as it becomes saturated, the voltage on line 120 is effectively clamped at the zener voltage characteristic level of zener diode 132.

Transistor 122 becomes saturated when its base is biased to a level substantially more positive than the zener voltage of zener diode 132. The voltage applied to the base of transistor 122 is a function of the voltage across capacitor 60 (and the load), conveyed through resistor 126, and is also a function of the full wave rectified voltage on line 112, which is conveyed through resistor 116. When the full wave rectified voltage applied to the base of transistor 122 through resistor 116 is more positive than the zener voltage of zener diode 132, transistor 122 becomes saturated and conducts, turning off MOSFET 118 by coupling its gate to zener voltage level. Resistor 116 has a substantially greater resistance than resistor 126, but its connection to the full wave rectified voltage causes it to exercise primary control of conductivity through transistor 122, and of MOSFET 118.

The zener voltage of zener diode 132 thus determines the maximum voltage developed across capacitor 60 and load 64. Because the voltage across capacitor 60 is continuously being drawn down by the discharge current flowing through load 64, but is only intermittently recharged by current flowing through MOSFET 118, there is a significant ripple component in the voltage applied to the load. The ripple voltage on the DC output signal is shown as a waveform 146 in FIG. 4C. Voltage converter 100 has slightly less ripple than voltage converter 10, because voltage converter 10 charges the capacitor that supplies current to the load for a shorter total time during each half cycle. As current flows from capacitor 60 through the load, capacitor 60 discharges and its voltages drops below its peak value, $V_Z$. The voltage subsequently increases in steps, as successive pulses of current are applied to charge capacitor 60 through MOSFET 118, as explained below. The rate of discharge of capacitor 60, τ, is equal to the product of the capacitance, C, of capacitor 60 and the resistance of the load, $R_L$. Because the ripple voltage is shown on an expanded scale in FIG. 4C, it may appear to be excessive; however, the ripple voltage range is typically less than ten percent of the DC output voltage level.

Figure 4B:
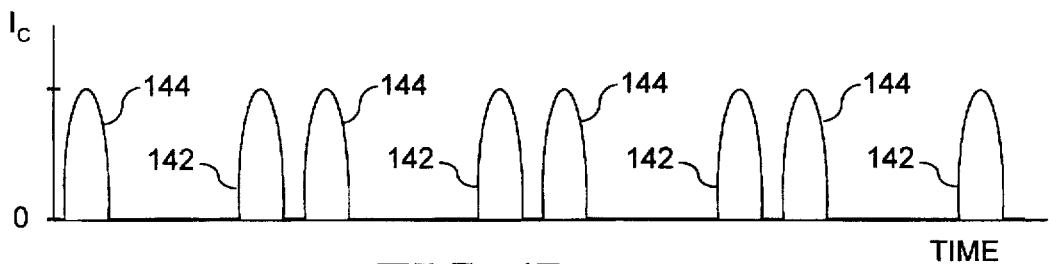
FIG. 4B is a graph showing the current pulses that charge a capacitor in the second embodiment of FIG. 3.
Figure 4C:
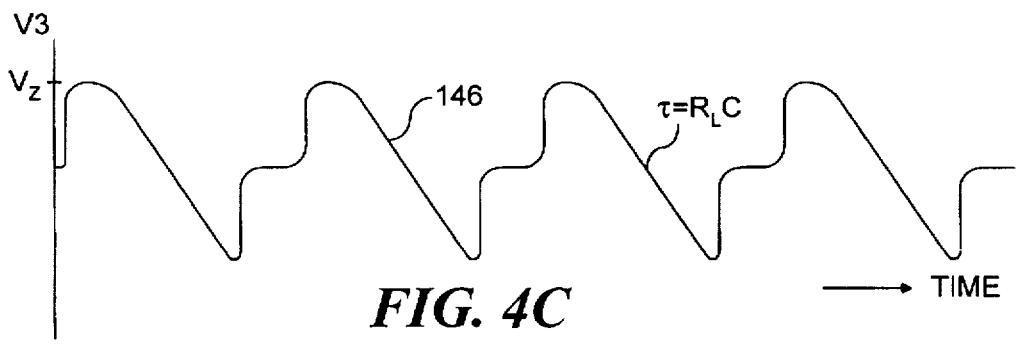
FIG. 4C is a graph showing the ripple on the DC output voltage of the second embodiment of the voltage converter.

In FIG. 4B, the pulses of current $I_C$ applied to charge capacitor 60 are shown. During each half cycle of the full wave rectified signal V1, two current pulses are applied through MOSFET 118. As the full wave rectified signal represented by waveform 140 in FIG. 4A decreases from its peak to zero, the voltage on the base of transistor 122 drops below the zener voltage $V_Z$, and transistor 122 stops conducting. The voltage applied to the gate of MOSFET 118 through resistor 114 then causes MOSFET 118 to begin conducting between its drain and source, thereby charging capacitor 60 with a pulse of current 142, as shown in FIG. 4B.

Subsequently, current pulse 142 ends as the voltage across capacitor 60 rises sufficiently to turn on transistor 122. The voltage across the capacitor, which is applied to the base of transistor 122 through resistor 126, biases the transistor to a conducting state, which reduces the voltage on the gate of MOSFET 118 below the level necessary for it to continue conducting. Alternatively, if the voltage across capacitor 60 (and load 64) does not reach a level sufficient to turn on transistor 122, the full wave rectified voltage level on line 120 will decline to a level that is insufficient to continue biasing MOSFET 118 into a conductive state.

A second current pulse 144 is produced as the full wave rectified waveform voltage begins increasing from zero towards its peak value during the next half cycle. This voltage again causes MOSFET 118 to conduct charge current $I_C$ to capacitor 60. As the full wave rectified signal applied to the base of transistor 122 through resistor 116 rises above the zener voltage, $V_Z$, the transistor turns on, turning off MOSFET 118 and ending the current pulse. So long as the voltage applied to the base of transistor 122 through resistor 126 or through resistor 116 does not substantially exceed the zener diode characteristic zener voltage $V_Z$, transistor 122 will remain in a non-conducting state.

Accordingly, the charge current for the second $I_C$ pulse applied to capacitor 60 terminates when the voltage applied to the base of resistor 122, either from capacitor 60 through resistor 126 or from line 112 through resistor 116 exceeds the zener voltage.

By providing two pulses of current to charge capacitor 60 each half cycle, voltage converter 100 is more effective than voltage converter 10 in minimizing ripple in the voltage across the load. Furthermore, since charge current is supplied to capacitor 60 and to the load for a long duration during each half cycle, voltage converter 100 operates more efficiently than voltage converter 10.

If a fault occurs, voltage converters 10 and 100 can apply full line voltage across the load. To protect against this possibility, the MOSFETs used in the voltage converters are selected to have a characteristic peak drain-to-source voltage rating that is substantially greater than the expected peak line voltage. In addition, the voltage converters each include an inherent fuse to protect the load if a fault occurs. Resistor 52 in voltage converter 10 and resistor 110 in voltage converter 100 are conventional carbon resistors, which almost always fail in an open circuit mode if subjected to power dissipation substantially in excess of the maximum rated value. In voltage converter 10, resistor 26 is also a carbon resistor. If these carbon resistors open due to excess current flow through them, any line voltage across the load will be terminated. These resistors thus act much like fuses to protect against short circuit conditions in the MOSFETs and other components.

Additional fault protection is provided in voltage converter 100 by zener diode 134. This zener diode has a characteristic zener voltage selected to ensure that failure of transistor 122 does not leave MOSFET 118 in a conductive state.

Although the present invention has been described in connection with the preferred embodiments disclosed above, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A voltage converter for converting an AC line signal to a DC output signal, comprising:
 (a) a rectifier that is coupled to the AC line signal and which produces a rectified signal;
 (b) a capacitor that is coupled to an output line that is adapted to supply a current to a load;
 (c) a first switching device that is controlled by a turn on voltage and a turn off voltage applied to a control terminal of the first switching device, said first switching device being coupled to the rectifier to receive the rectified signal at said control terminal, and to the capacitor, said first switching device enabling a current flow from the rectifier to charge the capacitor when the rectified signal at said control terminal reaches the turn on voltage that causes the first switching device to conduct;
 (d) a voltage limiter that includes a regulator for establishing a predetermined reference voltage; and
 (e) a second switching device that is coupled to:
  (i) the voltage limiter, said voltage limiter being coupled between the second switching device and the rectifier, to receive the rectified signal; and
  (ii) the rectifier to receive the rectified signal; and
 f. said second switching device having a control terminal coupled to the rectifier to receive the rectified signal and to the load to receive the DC output signal, a second switching device turn on voltage applied by the rectifier and the load to said control terminal determining if said second switching device conducts, said second switching device turn on voltage varying as a function of the predetermined reference voltage, the rectified signal, and the DC output signal from the load, so that said second switching device turn on voltage at the control terminal of the second switching device causes said second switching device to conduct, and thereby to apply the turn off voltage to the control terminal of the first switching device, said turn off voltage being regulated by the voltage limiter so as to control a voltage level of the DC output signal on the load.

2. The voltage converter of claim 1, wherein the first switching device comprises a MOSFET and the control terminal comprises a gate of the MOSFET.

3. The voltage converter of claim 1, wherein the second switching device comprises a pair of transistors, the voltage limiter being coupled to terminals of the pair of transistors.

4. The voltage converter of claim 1, wherein the second switching device comprises a transistor, the voltage limiter being coupled to the transistor so that the turn on voltage of the second switching device determines a minimum voltage necessary to bias the transistor into a conductive state.

5. The voltage converter of claim 1, further comprising a resistor that is coupled between the first switching device and the load, said resistor functioning as a fuse that opens if the current through the resistor exceeds a rated value, if a fault in the first switching device causes excess current to flow to the load.

6. The voltage converter of claim 4, wherein a base of the transistor is coupled to the rectifier and to the load, said transistor limiting the DC voltage level applied to the load during a portion of each half cycle of the AC line signal.

7. The voltage converter of claim 6, wherein current flows through the first switching device to charge the capacitor twice during each half cycle of the AC line signal.

8. The voltage converter of claim 1, further comprising a zener diode that is coupled in parallel with the second switching device and the voltage limiter, said zener diode limiting the control voltage applied to the control terminal of the first switching device if a fault occurs in the second switching device.

9. A voltage converter for converting an AC line signal to a DC output signal supplied to a load, comprising:
 (a) a full wave rectifier that converts the AC line signal to a corresponding full wave rectified signal comprising a plurality of substantially identical successive half cycle waveforms;
 (b) a capacitor adapted to be coupled in parallel with the load;
 (c) first switching means, coupled to the full wave rectifier and to the capacitor, for conducting a charge current to the capacitor at least once during each half cycle waveform, said first switching means being controlled by a turn on voltage and a turn off voltage applied to a control terminal of the first switching means; and
 (d) second switching means, coupled to the full wave rectifier, the capacitor, and the first switching means, and including a voltage limiter that limits the full wave rectified signal from the rectifier to the turn off voltage of the first switching means, for regulating a conductance of the first switching means as a function of both the DC output signal and the full wave rectified signal, both of which vary with time, and limiting the turn off voltage of the first switching means, thereby enhancing a switching speed of the first switching means and regulating the DC output signal so that it does not exceed a predetermined maximum voltage level.

10. The voltage converter of claim 9, wherein the second switching means comprise at least one transistor and a zener diode.

11. The voltage converter of claim 10, wherein the second switching means comprise a pair of transistors, each having a base, an emitter, and a collector, said pair of transistors having their collectors coupled together and their emitters coupled together, to form a differential pair.

12. The voltage converter of claim 9, wherein the first switching means comprise a MOSFET having a gate comprising the control terminal that is coupled to the second switching means.

13. The voltage converter of claim 9, further comprising a carbon resistor coupled in series between the full wave rectifier and the first switching means, said resistor failing in an open circuit condition if current flow through the carbon resistor substantially exceeds a maximum rated value as a result of a fault in one of the first switching means and the second switching means.

14. The voltage converter of claim 9, further comprising a zener diode coupled in parallel with the second switching means, said zener diode limiting a voltage applied to the load if a fault occurs in the second switching means.

15. A voltage converter for converting an AC line signal to a DC output signal, comprising:
   (a) a full wave rectifier, for converting the AC line signal to a full wave rectified signal:
   (b) a capacitor adapted to be coupled in parallel with a load;
   (c) a first transistor switch that is controlled by a turn on voltage and a turn off voltage sensed at a second terminal, said first transistor switch having three terminals, including a first terminal and a second terminal that are coupled to the full wave rectifier, and a third terminal that is coupled to the capacitor;
   (d) a zener diode having a predefined zener voltage; and
   (e) a second transistor switch that is coupled to the second terminal of the first transistor switch, to the capacitor, to the rectifier, and to the zener diode, said rectifier being connected between the second transistor switch and the capacitor to regulate a voltage therebetween, said zener diode being coupled between said second transistor switch and the rectifier to regulate the turn off voltage at the second terminal of the first transistor switch when the second transistor switch is conducting current, said second transistor switch regulating a maximum voltage level of the DC output signal as a function of the zener voltage by controlling the turn off voltage applied to the second terminal of the first transistor switch.

16. The voltage converter of claim 15, wherein the first transistor switch comprises a MOSFET, and wherein the second terminal comprises a gate of the MOSFET.

17. The voltage converter of claim 15, wherein the second transistor switch comprises two transistors, each having an emitter, a collector, and a base, said two transistors having their emitters and collectors coupled together in a differential pair, a base of one of the two transistors being coupled to the rectifier to respond to a periodically varying level of the full wave rectified signal, and a base of the other of the two transistors being coupled to the capacitor to sense a level of the DC output signal, the zener voltage of said zener diode determining a voltage that must be applied to the base of either transistor to cause that transistor to conduct.

18. The voltage converter of claim 15, wherein the second transistor switch comprises a transistor having a base, a collector, and an emitter, the base of said transistor being coupled to the full wave rectifier and to the capacitor, the predefined zener voltage of the zener diode determining a biasing voltage that must be applied to the base to cause the transistor to conduct.

19. A method for converting an AC line signal to a DC output signal, comprising the steps of:
   (a) full wave rectifying the AC line signal to produce a full wave rectified signal;
   (b) providing a MOSFET to control the full wave signal supplied to charge a load capacitor during a portion of each half cycle of the full wave rectified signal, the MOSFET having a control terminal controlled by a turn on voltage and a turn off voltage, the MOSFET being coupled to receive the full wave rectified signal and being coupled to the load capacitor;
   (c) providing a voltage limiter having a predetermined reference voltage level for regulating the turn off voltage applied to the control terminal of the MOSFET;
   (d) providing a transistor that is coupled to receive the full wave rectified signal, said transistor being coupled to the load capacitor, the MOSFET, and the voltage limiter; and
   (e) controlling a duration of the portion of the half cycle used to charge the load capacitor as a function of a voltage on the capacitor and as a function of a time varying magnitude of the periodically varying full wave rectified signal relative to the predetermined reference voltage level regulated by the voltage limiter, and selected to minimize a voltage range used to control the conduction of the MOSFET and thereby increase its switching speed, to limit a maximum voltage level of the DC output signal.

20. The method of claim 19, wherein the maximum voltage level is determined by a zener voltage characteristic of a zener diode.

21. The method of claim 19, further comprising the step of providing a carbon resistor to convey the full wave rectified signal, said carbon resistor failing in an open state if a fault causes an excess current to flow through the carbon resistor.

22. The method of claim 19, wherein current is supplied to charge the load capacitor during two discrete portions of the half cycle.

23. The method of claim 19, wherein current is supplied to charge the load capacitor at least once during each half cycle, when the time varying magnitude of the full wave rectified signal exceeds the reference voltage level and a voltage level of the DC output signal is less than the reference voltage.

* * * * *